United States Patent
Harel (10) Patent No.: US 12,387,001 B1
(45) Date of Patent: Aug. 12, 2025

(54) DYNAMIC ON-DEVICE SCREEN ACTIVITY DATA PROCESSING USEFUL FOR PRIVACY PROTECTION

(71) Applicant: Omer Harel, Tel Aviv (IL)

(72) Inventor: Omer Harel, Tel Aviv (IL)

( * ) Notice: Subject to any disclaimer, the term of this patent is extended or adjusted under 35 U.S.C. 154(b) by 0 days.

(21) Appl. No.: 18/929,704

(22) Filed: Oct. 29, 2024

(51) Int. Cl.
  *G06F 21/62* (2013.01)
  *G06F 11/30* (2006.01)
  *G06F 11/34* (2006.01)
  *H04L 67/50* (2022.01)

(52) U.S. Cl.
  CPC ...... *G06F 21/6245* (2013.01); *G06F 11/3072* (2013.01); *G06F 11/3409* (2013.01); *G06F 11/3438* (2013.01); *H04L 67/535* (2022.05)

(58) Field of Classification Search
  CPC ............. G06F 21/6245; G06F 11/3072; G06F 11/3409; G06F 11/3438; H04L 67/535; H04L 67/1396
  See application file for complete search history.

(56) References Cited

U.S. PATENT DOCUMENTS

2020/0133818 A1* 4/2020 Katami ................ G06F 11/321

FOREIGN PATENT DOCUMENTS

WO    WO-2025012970 A1 * 1/2025

\* cited by examiner

*Primary Examiner* — Esther B. Henderson (57) ABSTRACT

Method, system, and computer program product for dynamic on-device screen activity data processing. Data of screen activity on a display screen of a computation device is captured. Textual information of the screen activity is extracted from the data captured and stored locally in a database. Summarized data of the screen activity is generated using the textual information stored in the database and transmitted to a remote server configured to perform a task using summarized data received. Usage demand of on-device resources of the computation device for performing screen activity data processing operations is dynamically determined according to a policy defining at least one rule associated with at least one configurable parameter and representing a tradeoff between conserving usage of the on-device resources and optimization of the summarized data received at the remote server for the task.

18 Claims, 3 Drawing Sheets

DYNAMIC ON-DEVICE SCREEN ACTIVITY DATA PROCESSING USEFUL FOR PRIVACY PROTECTION

BACKGROUND

Some embodiments described in the present disclosure relate to data processing and, more specifically, but not exclusively, to dynamic on-device screen activity data processing, particularly useful for protecting privacy of a user of the device at hand.

Over the past few decades, computers have become an integral part of daily life due to their versatility, accessibility, and sheer power to handle complex tasks. They are pivotal in numerous domains, such as business, education, communication, healthcare, and entertainment. The widespread adoption of the internet and cloud computing has further amplified the role of computers, connecting people globally and making information readily accessible.

The rise and ever-growing ubiquity of computation devices and specifically client-side terminals, end user equipment, consumer electronics and/or the like, including for example personal computers (PCs), laptops, tablets, smartphones, and so forth, has provided individuals with unprecedented access to computing resources. These devices allow people to work remotely, access online services, and engage in digital entertainment, among other various practical applications. Such devices, in essence, serve as the endpoints through which users interact with vast networks and resources, both in the cloud and on local servers.

The proliferation of computers and internet connectivity has also opened the door to a range of abuses and online threats. While the benefits are undeniable, challenges and dangers such as cybercrime, productivity concerns, and online harassment have emerged.

As one prominent example of these growing concerns, the rise of social media platforms, gaming communities, and messaging apps has made children in particular more vulnerable to cyberbullying, where they may face harassment, intimidation, or shaming online. This can lead to severe emotional distress and, in extreme cases, tragic consequences such as depression or suicide. Parents and educators face challenges in monitoring and protecting children from such threats due to the pervasive nature of digital communication. While parental controls may use for example content filtering and/or access control for blocking usage or limiting access to certain websites, applications, and/or the like, avoidance of all perils cannot be guaranteed, whereas overseeing and/or monitoring online interactions may be overly burdensome on parents and too intrusive on children privacy.

Similarly, in workplaces, one of the common concerns is employees using computers for personal activities during work hours. This misuse can lead to productivity losses, as employees may spend time on social media, shopping sites, or watching videos instead of focusing on work tasks, as well as to security risks, where unregulated browsing may expose corporate systems to malware or phishing attacks. Employers often implement monitoring tools, content filters, and strict internet usage policies to mitigate this, but striking a balance between employee privacy and productivity remains challenging.

Law enforcement authorities may also face likewise difficulties and hurdles from technical and/or legal perspectives, e.g., in circumstances where tracking online activity of suspects for potential illicit or criminal behavior may be called for, whether it may serve as pre-emptive countermeasure, for forensic and/or evidence gathering purposes, and/or the like.

SUMMARY

It is an object of the present disclosure to describe a system and a method for dynamic on-device screen activity data processing.

The foregoing and other objects are achieved by the features of the independent claims. Further implementation forms are apparent from the dependent claims, the description and the figures.

According to one aspect of some embodiments of the disclosed subject matter there is provided a method for dynamic on-device screen activity data processing, comprising: capturing data of screen activity on a display screen of a computation device; extracting textual information of the screen activity from the data captured; storing in a database residing locally on the computation device the textual information extracted; generating summarized data of the screen activity using the textual information stored in the database; and transmitting via a network communication interface at least a portion of the summarized data generated to a remote server configured to perform a task using summarized data received; wherein usage demand of on-device resources of the computation device for performing screen activity data processing operations of at least one of the capturing data, extracting textual information, storing, generating summarized data, and transmitting is dynamically determined according to a policy defining at least one rule associated with at least one configurable parameter and representing a tradeoff between conserving usage of the on-device resources and optimization of the summarized data received at the remote server for the task.

According to another aspect of some embodiments of the disclosed subject matter there is provided an apparatus for dynamic on-device screen activity data processing, comprising: at least one processor adapted for: capturing data of screen activity on a display screen of a computation device; extracting textual information of the screen activity from the data captured; storing in a database residing locally on the computation device the textual information extracted; generating summarized data of the screen activity using the textual information stored in the database; and transmitting via a network communication interface at least a portion of the summarized data generated to a remote server configured to perform a task using summarized data received; wherein usage demand of on-device resources of the computation device for performing screen activity data processing operations of at least one of the capturing data, extracting textual information, storing, generating summarized data, and transmitting is dynamically determined according to a policy defining at least one rule associated with at least one configurable parameter and representing a tradeoff between conserving usage of the on-device resources and optimization of the summarized data received at the remote server for the task.

According to yet another aspect of some embodiments of the disclosed subject matter there is provided a computer program product for dynamic on-device screen activity data processing, the computer program comprising: a non-transitory computer readable storage medium; program instructions which, when executed by at least one processor, cause the at least one processor to perform operations comprising: capturing data of screen activity on a display screen of a computation device; extracting textual information of the screen activity from the data captured; storing in a database residing locally on the computation device the textual information extracted; generating summarized data of the screen activity using the textual information stored in the database; and transmitting via a network communication interface at least a portion of the summarized data generated to a remote server configured to perform a task using summarized data received; wherein usage demand of on-device resources of the computation device for performing screen activity data processing operations of at least one of the capturing data, extracting textual information, storing, generating summarized data, and transmitting is dynamically determined according to a policy defining at least one rule associated with at least one configurable parameter and representing a tradeoff between conserving usage of the on-device resources and optimization of the summarized data received at the remote server for the task.

Optionally, a rule of the policy defines an action to be taken in response to a condition being met regarding a value of a respective one of the at least one configurable parameter associated with the rule.

More optionally, the action comprises a member selected from the group consisting of: reporting to the remote server; pausing performance of at least one of the capturing data, extracting textual information, generating summarized data, and transmitting; resuming performance of at least one of the capturing data, extracting textual information, generating summarized data, and transmitting; adjusting a frequency of performing the capturing data; adjusting a resolution of performing at least one of the capturing data and the extracting textual information; storing in the database summarized data generated; storing in the database log information; performing data retention management operation on the database; performing data backup operation; checking for updates to the policy from the remote server; and applying new rules per policy update received from the remote server.

Optionally, the at least one configurable parameter comprises an operational parameter of the computation device.

More optionally, the operational parameter comprises a member selected from the group consisting of: temperature; battery charge level; network availability; and resource utilization.

Optionally, the at least one configurable parameter comprises a behavioral parameter of a user of the computation device.

More optionally, the behavioral parameter comprises a member selected from the group consisting of: user engagement level; user engagement indicators; application usage patterns; user activity peak hours; and user activity data sensitivity.

Optionally, the at least one configurable parameter comprises an administrative parameter of user activity analysis performance and data management on the computation device.

More optionally, the administrative parameter comprises a member selected from the group consisting of: summarized data amount limit; summarized data rate limit; policy update checking rate; information logging level; log retention limit; local data retention limit; and data backup rate.

Optionally, the extracting textual information comprises performing at least one of: optical character recognition (OCR), and user interface (UI) element recognition.

Optionally, the storing in the database the textual information extracted utilizes a structured data format.

Optionally, the generating summarized data utilizes at least one lightweight artificial intelligence (AI) model optimized for the computation device.

More optionally, the at least one lightweight artificial intelligence (AI) model comprises a large language model (LLM).

More optionally, the at least one lightweight artificial intelligence (AI) model utilizes a local neural processing unit (NPU) of the computation device.

Optionally, there is further provided for identifying an application actively in use by a user of the computation device, wherein at least one of the capturing data and extracting textual information is performed according to the application identified.

Optionally, the summarized data complies with privacy protection requirements whereby no personal information of a user of the computation device is derivable from the summarized data.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Some embodiments described in the present disclosure relate to data processing and, more specifically, but not exclusively, to dynamic on-device screen activity data processing.

Screen data can be a valuable resource for monitoring user activity on a computing device. Screen interactions such as mouse movements, clicks, keyboard inputs, and/or the like, may help identify user engagement levels and/or user interactions with various applications. By tracking which applications are in use and for how long, recording the sequence of actions taken on the screen, intercepting error messages or failed interactions, tracking when users are actively focused on the screen, monitoring what information users access or provide, identifying unusual patterns in screen activity, and/or the like, there may be gained useful insights pertaining to user activity, such as for example, application usage patterns, productivity levels, user preferences and habits, data breaches or illicit behavior, and/or the like.

While monitoring screen data can provide valuable insights, it also raises privacy and ethical considerations. Transparency, user consent, and data security are crucial to ensure responsible use of this data.

One technical challenge dealt with by the disclosed subject matter is how to provide for effective screen data processing and/or analysis, so as to enhance user experience, improve productivity, and maintain security, all while being mindful of ethical and legal implications.

Another technical challenge dealt with by the disclosed subject matter is how to provide for efficient and cost-effective screen data processing and/or analysis.

Summarizing screen data captured during user activity monitoring may be beneficial in multiple aspects. The summarized data may enhance decision-making and leverage performance of further analysis and/or processing tasks using it as input, by providing concise information that is significantly less resource-intensive than the raw data to process, record, transfer, and/or the like, and in which patterns or trends over time may be more prominent or highlighted. The summarized data may be aggregated and/or anonymized data, such that privacy and/or ethical concerns in usage and/or processing thereof may be alleviated. Overall, summarizing screen data enhances the utility of monitoring efforts, making it more actionable and relevant. By transforming complex datasets into digestible insights, screen data summarization may drive improvements in user experience, operational efficiency, strategic planning, and/or the like.

Capturing and summarizing information displayed on a user's computation device screen for remote analysis typically requires significant computing resources. One straightforward solution may be to increase device computational power and hardware performance, but this approach is costly and inefficient. Another option is to constantly send screen captures, intercepted data, or other kinds of data from the device to a remote server. However, such course of action is resource-consuming and heavily impacts communication mediums, resulting in high data transmission costs, significant network traces indicating the activity, and potential network congestion if done at scale.

The disclosed subject matter provides for dynamic on-device screen activity data processing, which involves an intelligent agent that monitors and records screen activity on a device, extracts textual information from the screen data captured (e.g., performs optical character recognition (OCR), user interface (UI) element recognition, and/or the like), stores extracted data locally, and summarizes the extracted data, optionally using artificial intelligence (AI) models for on-device contextual analysis. Summarized data is then securely transmitted to a remote server, optimizing performance and ensuring privacy.

The agent according to the disclosed subject matter is aimed at providing an ability to dynamically balance device performance and data processing, based on the unique characteristics of the device that the agent may identify and adjust its behavior to. The tradeoffs between device performance (such as, for example, battery and CPU usage, and/or the like) and data processing efficiency, yield, accuracy, optimality, and/or other likewise performance-related metrics and/or benchmarks, may be defined, set, and/or otherwise determined according to a given policy, optionally provided, e.g., in a configuration file and/or the like.

In some embodiments, the disclosed subject matter involves deploying the intelligent agent on a computation device, which may optionally be equipped with a neural processing unit (NPU) and/or likewise hardware optimized for neural computation tasks, in addition to a central processing unit (CPU) where on-device computation operations may normally be performed. The agent may be configured to continuously capture screen activity in real-time, using screen capture tools and/or techniques, as may be commercially available and/or known in the art.

The agent may comprise a screen capture and analysis module that extracts text from the captured screen data and identifies application programs in use and/or otherwise running, user interface elements presented and/or interacted with, and/or other likewise relevant information pertaining screen activity of a user. The screen capture and analysis module may monitor and record screen activity in real-time. The screen capture and analysis module may optionally perform OCR and UI element recognition, process screen data for other likewise relevant information, and/or the like.

The agent may comprise a local database, where the captured data may be stored locally therein, optionally in a structured format, thus ensuring quick access and minimal latency.

The agent may comprise a contextual analysis module, which may be configured to analyze and summarize captured data. The contextual analysis module may be employed for data analysis and summarization of textual information extracted from the captured screen data and locally stored in the database. The contextual analysis module may be powered by lightweight AI models, which may be optimized for efficient on-device processing.

In some embodiments, the agent may periodically analyze the captured information based on specific conditions or circumstances such as for example, battery status, user activity, and/or the like, thereby ensuring context-aware and efficient processing.

The agent may comprise a communication module, which may be configured to handle transmission of data to a remote server. The communication module may be used for transmitting summarized data to the remote server, for further processing, analysis, storage, and/or likewise actions on the summarized data at remote server. The communication module may be configured to handle a secure and reliable transmission of data to the remote server, for privacy protection and optimized performance.

The agent may be configured to operate its modules based on a policy and real-time device and/or user activity parameters, to optimize runtime and minimize the impact on device performance, temperature and battery life, inter alia.

An example list of configurable parameters that may be adjusted to modify the agent's behavior is provided on Table 1 herein.

TABLE 1

| Example | Description |
| --- | --- |
| Baseline Policy | The agent may receive a baseline policy from the remote server that may include guidelines for the agent's behavior. Part of this behavior may involve summarizing captured screen data. The baseline policy may set initial operational parameters for the agent. |
| Summarization Frequency | The agent may be configured to summarize text from the captured screen data at a preset rate, such as for example, up to a specified number of times per day, and/or the like. Optionally the rate may be increased at need, for example, if a predefined percentage of this limit is reached by mid-day, the agent may report to the remote server and may receive adjustments to the allowed maximum number of summaries. |
| Temperature Check | Before conducting operations, the agent may check the device's temperature. If the device is too hot, the agent may halt its operations to prevent overheating and protect hardware. |
| User Activity Monitoring | The agent may monitor user activity, e.g. through mouse movements and interactions, keyboard taps, an/or the like. If the user is actively using the device, the agent may pause or reduce its operations, deferring these tasks until the device is idle. Additionally, the agent may detect if the user is physically present. When the user leaves the device, the agent may utilize more device power to conduct its operations. The agent may determine user presence by utilizing tools and/or techniques such as analyzing mouse usage and/or keyboard tap patterns and the way the user interacts with on-screen data, distinguishing between human and bot behavior. If there is no activity or if the screen remains unchanged for an extended period, the agent can assume that the user is not present. |
| Battery Status Check | If the battery level drops below a certain threshold, the agent may reduce the frequency of data capture and summarization activities to conserve power, ensuring continued operation. |
| Network Availability | The agent may check network availability before sending summarized data to the server. If the network is unavailable, the agent stores the summaries locally and transmits them once the network is restored. |
| Application Usage Patterns | The agent may adjust its capture frequency based on the applications in use. For high-priority applications, such as for example, a word processor, browser, terminal window, database explorer, and/or the like, the agent may increase the capture frequency to ensure detailed monitoring. The list of high-priority applications may be provided by the server as part of the baseline policy, and optionally may be occasionally updated. |
| Time of Day Adjustments | The agent may adjust its activity based on the time of day, capturing data more frequently during peak hours and less frequently during off-peak hours, aligning with user activity patterns. |
| Resource Utilization Monitoring | The agent may monitor the device's resource utilization, such as for example, CPU and memory usage, and/or the like. If high resource utilization is detected, the agent may postpone intensive tasks like OCR and data analysis to avoid impacting performance. |
| Policy Updates | The agent may periodically check for policy updates from the server, which may include for example new rules for data capture frequency and summarization limits, ensuring that the agent operate within the latest guidelines. |

It will be appreciated that Table 1 herein is merely aimed at providing general overview of the disclosed subject matter, including some exemplary capabilities and potential applications thereof, and is not meant to be a comprehensive list.

Further exemplary configurable parameters for dynamic on-device screen activity data processing in accordance with some embodiments of the disclosed subject matter, are provided in the following exemplary configuration file.

Configuration File Example

```
#Baseline Policy Configuration
##Summarization Frequency Settings
###SummarizationFrequency
    MaxSummariesPerDay: 10
        _Maximum number of summaries per day_
    MidDayThreshold: 70
        _Percentage threshold reached by mid-day_
    Action: ReportToServer
        _Action to take when threshold is reached_
##Temperature Check Settings
###TemperatureCheck
    MaxTemperature: 85 (Celsius)
        _Maximum allowed temperature_
    Resume Temperature: 75 (Celsius)
        _Temperature to resume operations_
    Action: HaltOperations
        _Action to take when temperature is too high_
##User Activity Monitoring Settings
###UserActivityMonitoring
    PauseIfActive: true
        _Pause operations if user is active_
    DetectUserPresence: MouseMovements, Interactions
        _Methods to detect user presence_
    ResumeIfIdle: true
        _Resume operations if user is idle_
##Battery Status Check Settings
###BatteryStatusCheck
    ReduceFrequencyThreshold: 20 (Percent)
        _Battery threshold to reduce frequency_
    HaltOperationsThreshold: 10 (Percent)
        _Battery threshold to halt operations_
##Network Availability Settings
###NetworkAvailability
    CheckBeforeTransmit: true
        _Check network availability before transmitting_
    StoreLocallyIfUnavailable: true
        _Store data locally if network is unavailable_
##Application Usage Patterns Settings
###ApplicationUsagePatterns
    HighPriorityApplications: Terminal, Thunderbird, Firefox
        _High-priority applications_
    LowPriorityApplications: Gimp, Weather
        _Low-priority applications_
##Time of Day Adjustments Settings
###TimeOfDayAdjustments
    PeakHoursStart: 09:00
        _Start time for peak hours_
    PeakHoursEnd: 18:00
        _End time for peak hours_
##Resource Utilization Monitoring Settings
###ResourceUtilizationMonitoring
    CPUUsageThreshold: 80 (Percent)
        _CPU usage threshold to postpone tasks_
    MemoryUsageThreshold: 75 (Percent)
        _Memory usage threshold to postpone tasks_
    Action: PostponeIntensiveTasks
        _Action to take when thresholds are exceeded_
##Policy Updates Settings
###Policy Updates
    CheckFrequency: 6 (Hours)
        _Frequency to check for policy updates_
    Action: ApplyNewRules
        _Action to apply new rules_
```

Data Sensitivity Handling Settings
DataSensitivityHandling
High Sensitivity
  CaptureFrequency: Increased
    _The agent captures data more frequently when sensitivity is high._
  Focus: SpecificUIElements
    _The agent focuses on capturing and analyzing specific user interface elements that are deemed critical._
Low Sensitivity
  CaptureFrequency: Decreased
    _The agent captures data less frequently when sensitivity is low._
  Focus: BroaderData
    _The agent focuses on capturing and analyzing broader data elements, without specific emphasis._
Logging and Monitoring Settings
LoggingAndMonitoring
  EnableLogging: true
    _Enable logging_
  LogLevel: INFO
    _Level of logging_
  LogRetentionDays: 30
    _Number of days to retain logs_
Data Retention Settings
DataRetention
  LocalDataRetentionDays: 7
    _Number of days to retain local data_
Backup Procedures Settings
BackupProcedures
  EnableBackup: true
    _Enable data backup_
  BackupFrequency: 24 (Hours)
    _Frequency to backup data_
Fallback Mechanisms Settings
FallbackMechanisms
  ExtendedNetworkOutageAction: StoreLocally
    _Action to take on extended network outage_

One technical effect of utilizing the disclosed subject matter is to provide for an implementation of a host system for an intelligent agent on a computation device, which involves a multi-module approach to ensure efficient and effective monitoring, analysis, and summarization of screen activity. It will be appreciated that in accordance with some embodiments, each module within the host system may play a contributory role in the overall functionality, leveraging the device's resources such as local NPU and/or the like for optimized on-device processing.

Another technical effect of utilizing the disclosed subject matter is to provide for efficient and effective on-device monitoring, analysis, and/or summarization of screen activity, which relies on several recent technological advancements that have only recently become feasible for consumer applications. These include the emergence of optimized language models and the availability of NPUs in consumer devices. By integrating this technology into environments typically managed by older-generation technology—such as monitoring, networking, and local storage of the device— the disclosed subject matter can leverage AI and hardware advancements to perform operations and/or tasks more efficiently and effectively than traditional methods.

The disclosed subject matter improves upon and provides many advantages over pre-existing approaches.

One example for the various manners in which the disclosed subject matter may be advantageous is by providing for an efficient resource utilization. By leveraging the agent's logic and the existing NPU and/or likewise hardware within the device for performing on-device analysis, according to some embodiments, the disclosed subject matter reduces the need for additional hardware upgrades. This approach makes the disclosed subject matter more cost-effective and accessible. For instance, real-time screen activity capture and analysis typically require significant processing power, but the agent can determine when and how to summarize the screen activity based on predefined rules. This makes it suitable for resource-constrained devices, ensuring optimal performance when combined with the NPU.

Another example of how the disclosed subject matter improves upon pre-existing approaches is by providing for a minimized data transmission. The disclosed subject matter, according to some embodiments, summarizes the captured data on the device before transmitting it to the remote server, significantly reducing the amount of data sent. This minimizes network usage and speeds up the data transfer process. For example, instead of transmitting raw screen capture data, which can be large and bandwidth-intensive, the agent may send concise summaries that are quicker to upload, reducing latency and improving efficiency.

Yet another example of the technical benefits of the disclosed subject matter is by providing for enhanced privacy and security. Processing data locally on the device before sending summarized results to the remote server, according to some embodiments of the disclosed subject matter, enhances privacy and security. Sensitive information is kept on the device, and only necessary, aggregated data is transmitted, according to these embodiments. This ensures that personal information remains protected, complies with privacy regulations, and builds user trust.

As will be readily appreciated by a skilled artisan, the disclosed subject matter according to some embodiments may be utilized in various practical applications.

Exemplary usages of the disclosed subject matter include:
  Monitoring children's devices to detect potential threats without eavesdropping on their communications or accessing their device content;
  Generating daily summaries of employees' activities and sending abstract reports at regular intervals;
  Monitoring a suspect's device without eavesdropping on their communications or device content, and sending information to a server for further analysis only if suspicious or incriminating materials are found on the suspect's device;
  Any other likewise user activity monitoring and reporting tasks.

To further illustrate, with regard to the aforesaid exemplary use case of productivity monitoring in the workplace context, a key value of the disclosed subject matter may be in providing stakeholders with a summary of what their team members and/or other teams may actually be working on. This approach may allow managers to better understand the gap between what may be planned and what may actually be worked on. It may also promote transparency across the organization, potentially improving productivity, enhancing data flow between teams, reducing frustration for employees, and/or the like.

Other technical challenges, approaches, effects, and/or use cases of the disclosed subject matter improved upon over pre-existing tools and/or techniques may be apparent from the detailed description herein.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
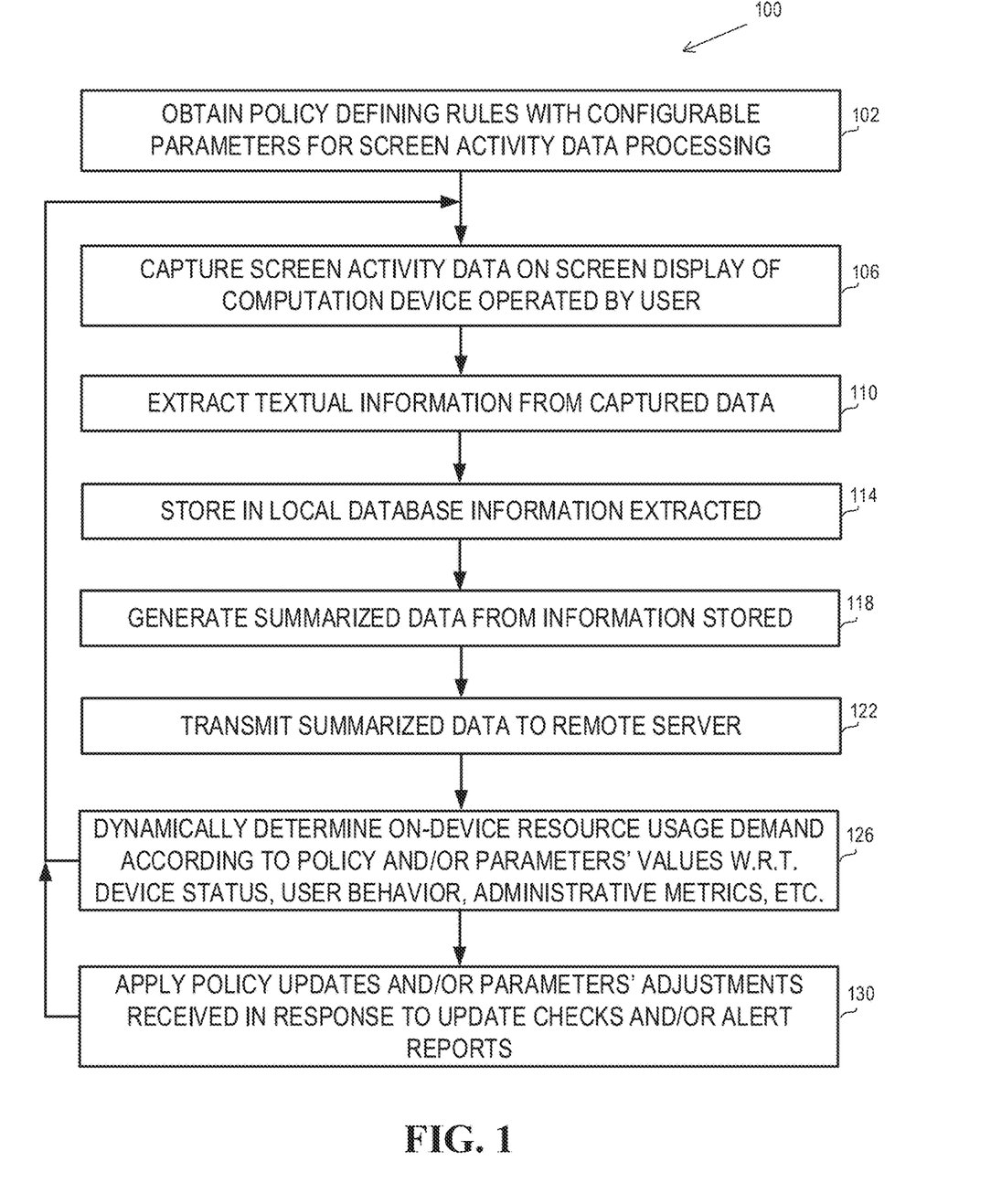
FIG. 1 is a flowchart schematically representing an optional flow of operations for dynamic on-device screen activity data processing, according to some embodiments.

Reference is now made to FIG. 1 which is a flowchart schematically representing an optional flow of operations for dynamic on-device screen activity data processing, according to some embodiments.

An exemplary process 100 may be executed for purposes of monitoring and/or reporting screen activity on a computation device operated by a user, in an efficient and effective manner. The process 100 may be carried out locally on the computation device and utilized so as to optimize performance and/or yield of screen activity data processing acts and/or operations, while avoiding and/or minimizing adverse effects on the device and/or its operation. The process 100 and its on-device local execution may be further taken advantage of for protection of the user's privacy, by making sure that only anonymized and/or aggregated screen activity data (e.g., summarized data) may be shared with other devices and/or entities, e.g., sent to a remote server and/or the like. The acts and/or operations of the process 100 may be performed adaptively and/or reactively according to predefined rules and real-time conditions and/or contingencies, such as device status, user behavior, data analytics, and/or the like.

As shown on FIG. 1, at 102 a policy defining rules with configurable parameters for screen activity data processing may be obtained. For example, the policy may be received at the device from a remote server, e.g., returned in response to a query from an agent deployed on the device and configured for performing one or more of the acts and/or operations for dynamic on-device screen activity data processing of the process 100. As another example, the policy may be incorporated within the agent when initially installed on the device. Additionally or alternatively, any other likewise data retrieval and/or exchange mechanisms may be employed, for example, the policy may be downloaded to an enterprise server and distributed via the enterprise network to individual machines.

In some embodiments, an output of the process 100 may be provided to another device and/or entity for further processing, analysis, storage, and/or the like, e.g., a remote server. The remote server may be configured to perform a task using data received from the device, such as for example, detecting potential threats to the device's user (e.g., cyberbullying and/or the like), tracking productivity of the device's user (e.g., work input and/or the like), detecting suspicious or incriminating content of the device's user, and/or the like. The rules and/or configurable parameters associated therewith, as defined in the policy, may represent a tradeoff between conserving usage of on-device resources and optimization of the data received at the remote server for the task at hand.

In some embodiments, one or more of the rules within the policy may define one or more actions to be taken when a condition specified is met. The condition may relate to a value of one of the configurable parameters, or to a set of values of a group of configurable parameters, such as for example, current percentage of utilization of one or more on-device resources, user engagement level detected, rate of summarized data transmitted within a defined time period, and/or the like.

An action to be taken when the condition is met may be, for example, reporting to the remote server, pausing and/or resuming operations of screen activity data processing (e.g., pausing and/or resuming performance of the screen data capturing, textual information extraction, summarized data generation, data transmission, and/or the like), adjusting a frequency of the screen data capturing, adjusting a resolution of the textual information extraction, storing data locally (e.g., storing in a local database the summarized data generated), storing locally log information, performing data retention management operation on locally stored data (e.g., expunging from a local database historic data older than a defined retention period and/or the like), performing data backup operation, checking for updates to the policy from the remote server, applying new rule(s) per policy update received from the remote server, and/or the like.

In some embodiments, the configurable parameters may comprise at least one operational parameter of the device, such as for example, temperature, battery charge level, network availability, resource utilization (e.g., CPU and/or memory usage), and/or any other likewise device-related parameters.

Additionally or alternatively, the configurable parameters may comprise at least one behavioral parameter of a user of the device, such as for example, user engagement level (e.g., active, idle, away from device, and/or the like), user engagement indicators (e.g., mouse movements, keyboard taps, and/or the like), application usage patterns (e.g., applications and/or application types of different levels of susceptibility to illicit behavior and/or the like), user activity peak hours, user activity data sensitivity (e.g., criticality of accurate and/or timely detection of suspect content, and/or the like), and/or any other likewise usage-related parameters.

Yet additionally or alternatively, the configurable parameters may comprise at least one administrative parameter of user activity analysis performance and data management on the device, such as for example, summarized data amount limit (e.g., maximum number of summaries generated per day), summarized data rate limit (e.g., maximum percentage from quota of daily summaries before mid-day), policy update checking rate, information logging level, log retention limit, local data retention limit, data backup rate, and/or the like.

At 106, screen activity data on a screen display of the computation device, in course of its operation by a user, may be captured. The capturing of screen activity data may be performed using screen capture tools, such as may be commercially available, and which may be configured for taking and recording screenshots of the screen display and/or selected areas thereof. The captured screen data may comprise images, videos, combinations thereof, and/or the like. The capture frequency, resolution, and/or other likewise parameters may be set according to the policy as obtained at 102 and/or adjusted responsive to real-time conditions and/or criteria, e.g., decreased and/or maintained at a minimal level for conserving power during low-battery mode and/or the like.

At 110, textual information may be extracted from the screen data as captured at 102. The extraction of textual information from recorded screenshots may include operations such as OCR and UI element recognition, for example. In some embodiments, the screen capture and text extraction may be performed simultaneously and/or in real-time at least in part. Additionally or alternatively, some and/or all screen capture and/or text extraction activities may be scheduled according to real-time conditions and/or criteria, e.g., paused and/or reduced when CPU and/or memory utilization exceed threshold and resumed and/or increased when acceptable level reached again. Similarly, resolution and/or other likewise parameters of the text extraction operations may be set according to the policy as obtained at 102 and/or adjusted adaptively and/or reactively, e.g., responsive to user engagement levels, application usage patterns, data sensitivity levels, and/or the like. For example, focus may vary from particular and/or recent UI elements to broader contextual information and vice versa.

In some embodiments, identification of specific applications in use may be performed, using process enumeration, operating system log analysis, querying operating system APIs, and/or any likewise operations or combinations thereof for determining which applications are installed and/or active on the device. The screen capture and/or text extraction may be performed in accordance with the identified active applications for enhancing relevance and/or context of the information captured and/or analyzed. For example, in some use cases, applications which may be considered as high-priority such as a web browser and/or the like may trigger increased capture frequency and/or focusing on specific UI elements, whereas for other applications considered as low-priority such as a photo editor and/or the like reduced capture frequency and/or the like may be employed.

At 114, screen data and/or information extracted and/or otherwise obtained at 102 and/or 110 by screen capture and/or text extraction operations may be stored locally on the device, e.g., in a local database. In some embodiments, the extracted textual information may be stored in the local database in a structured format. Optionally the local database may be configured to use efficient indexing and/or storage mechanisms to provide quick access with minimal latency and/or overhead, for allowing rapid data retrieval and further processing thereof.

At 118, summarized data of screen activity may be generated from the information stored in the local database at 114. Optionally the summarization of screen data may be performed using one or more AI models, such as for example, LLMs and/or the like. The AI model(s) utilized may be lightweight and/or optimized for on-device processing. In some embodiments, the AI model(s) or at least portion thereof may utilize an on-device NPU for improved performance.

At 122, summarized data as generated at 118 may be transmitted to a remote server for further processing, analysis, storage, and/or the like.

At 126, on-device resource usage demand for performing one or more acts and/or operations of screen activity data processing on the computation device, as may be carried out through 106 to 122, may be dynamically determined according to the policy as obtained at 102 and/or one or more values of respective one or more configurable parameters as defined in the policy, e.g., device status, user behavior, administrative metrics, and/or any likewise parameters and/or combination thereof. The determination may be made concurrently, sequentially, and/or at any order along with one or more of the on-device screen activity data processing acts and/or operations at 106 to 122. Optionally, the determination may be made in an adaptive and/or reactive manner according to real-time conditions and/or criteria for conserving on-device resource usage while assuring quality and/or timeliness of the summarized data received at the remote server as result.

At 130, one or more updates and/or adjustments to configurable parameters of the policy, as received in response to update checks and/or alert reports, e.g., made to the remote server, may be applied. The application of policy updates and/or parameters' adjustments may be performed periodically, on-demand, contingency-based, and/or in any combination thereof. Optionally the application may be according to rules defined in the policy itself, for example, the policy may define periodic updates checks settings, scenarios for instant adjustment of parameter(s), and/or the like. Following the policy updating and/or parameter adjustment, the process 100 may continue as before, with the resulting updated policy used in a similar manner as the policy originally obtained at 102.

Figure 2:
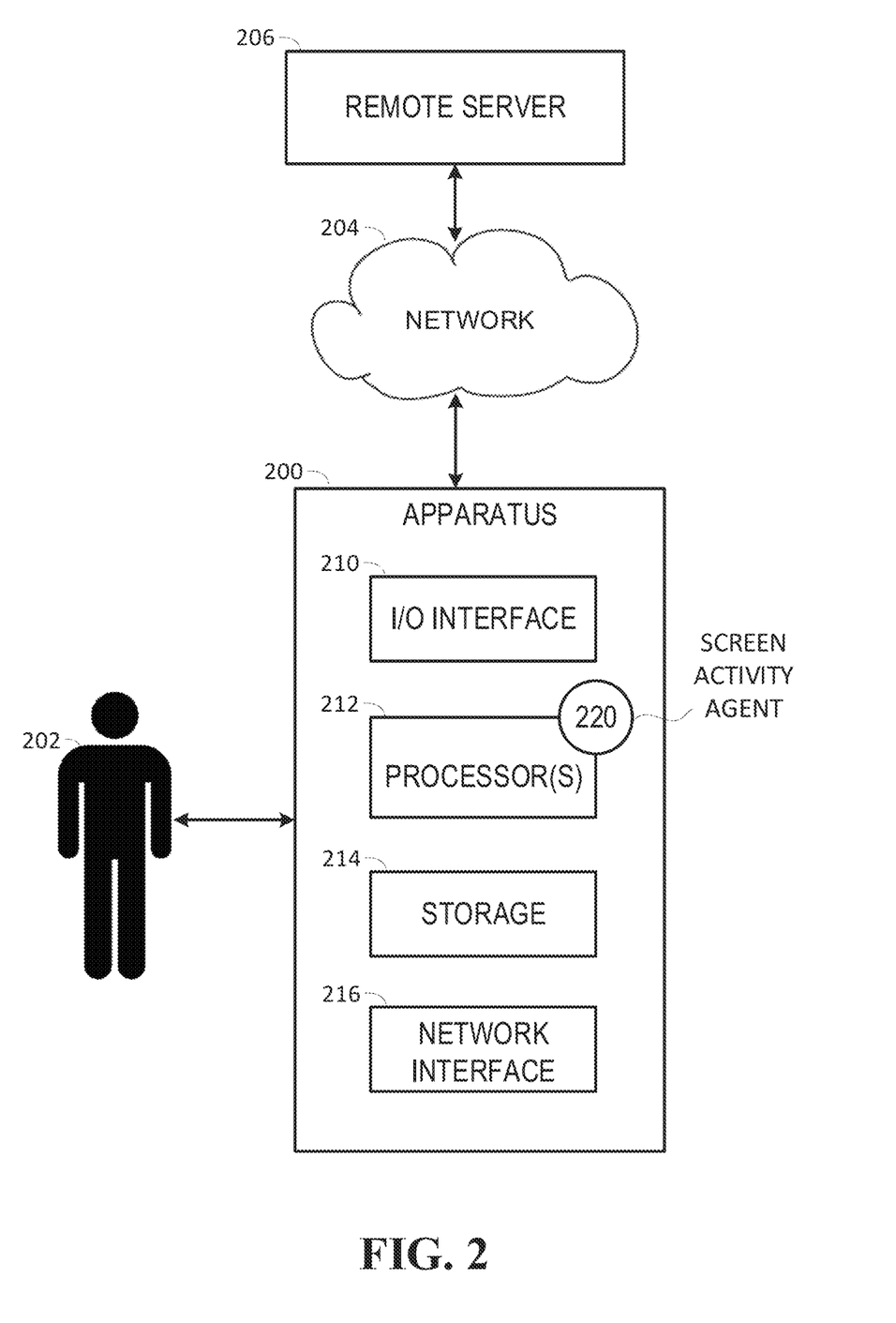
FIG. 2 is a block diagram of an exemplary apparatus for dynamic on-device screen activity data processing, according to some embodiments.

Reference is now made to FIG. 2 which is a block diagram of an exemplary apparatus for dynamic on-device screen activity data processing, according to some embodiments. An exemplary apparatus 200 may be used for performing one or more of the acts and/or operations for dynamic on-device screen activity data processing, such as described with reference to FIG. 1 herein.

The apparatus 200 may include and/or be implemented as, for example, desktop computer, laptop computer, Smartphone, tablet computer, client terminal, server, computing node, cluster of computing nodes, proprietary computation device and/or the like, which may be used and/or operated by a user 202.

The apparatus 200 may include and/or be coupled with an Input/Output (I/O) interface 210 for receiving input from and/or providing output to the user 202 and/or one or more external devices, systems, services and/or the like, one or more processor(s) 212 for executing a process such as the optional flow of operations 100 as illustrated in FIG. 1, a storage 214 for storing data and/or code (program store), a network interface 216 for transmitting and/or receiving network communications, and/or the like.

The I/O interface 210 may include one or more Human-Machine Interfaces (HMI) for interacting with the user 202, for example, a keyboard, a pointing device (e.g., a mouse, a touchpad, a trackball, etc.), a screen, a touchscreen, a digital pen, a speaker, an earphone, a microphone and/or the like. The user may therefore operate one or more of the HMI interfaces of the I/O interface 210 to interact with the apparatus 200.

The I/O interface 210 may further include one or more wired and/or wireless I/O interfaces, ports, interconnections and/or the like for connecting to one or more external devices, for example, a Universal Serial Bus (USB) interface, a serial interface, a Radio Frequency (RF) interface, a Bluetooth interface and/or the like. Through the I/O interface 210, the apparatus 200 may communicate with one or more external devices (not shown) attached to the I/O interface(s), for example, an attachable mass storage device, an external media device and/or the like.

The processor(s) 212, homogenous or heterogeneous, may include one or more processing nodes and/or cores arranged for parallel processing, as clusters and/or as one or more multi core processor(s).

The storage 214 may include one or more non-transitory persistent storage devices, for example, a Read Only Memory (ROM), a Flash array, a Solid-State Drive (SSD), a hard drive (HDD) and/or the like. The storage 214 may also include one or more volatile devices, for example, a Random Access Memory (RAM) component, a cache and/or the like. The storage 214 may further comprise one or more local and/or remote network storage resources, for example, a storage server, a Network Attached Storage (NAS), a network drive, a cloud storage service and/or the like accessible via the I/O interface 210 and/or network interface 216.

The processor(s) 212 may execute one or more software modules, for example, a process, a script, an application, an agent, a utility, a tool, an Operating System (OS), a service, a plug-in, an add-on and/or the like each comprising a plurality of program instructions stored in a non-transitory medium (program store) such as the storage 214 and executed by one or more processors such as the processor(s) 212.

Optionally, the processor(s) 212 may include, utilize and/or apply one or more hardware elements available in the apparatus 200, for example, a circuit, a component, an Integrated Circuit (IC), a Field Programmable Gate Array (FPGA), an Application Specific Integrated Circuit (ASIC), a Digital Signals Processor (DSP), a Graphic Processing Unit (GPU), a Central Processing Unit (CPU), a Neural Processing Unit (NPU), an Artificial Intelligence (AI) accelerator, and/or the like.

The processor(s) 212 may therefore execute one or more functional modules utilized by one or more software modules, one or more of the hardware elements and/or a combination thereof. For example, the processor(s) 212 may execute a screen activity agent 220 configured to execute the process 100 and/or part thereof for dynamic on-device screen activity data processing as may be performed in monitoring and/or reporting screen activity of the user 202.

The network interface 216 may include one or more network adapters for connecting to a network 204 which may comprise one or more wired and/or wireless networks, for example, a Local Area Network (LAN), a Wireless LAN (WLAN, e.g. Wi-Fi), a Wide Area Network (WAN), a Metropolitan Area Network (MAN), a cellular network, the internet, and/or the like.

Via the network interface 216, the apparatus 200 may connect to the network 204 and communicate with one or more remote network resources, such as, for example, one or more servers, computing nodes, clusters of computing nodes, platforms, systems, services, and/or the like, collectively designated as remote server 206, that may configured to receive data from and/or provide data to the apparatus 200.

Optionally, the remote server 206 and/or the apparatus 200, specifically the screen activity agent 220 may be utilized by one or more cloud computing services, platforms and/or infrastructures such as, for example, Infrastructure as a Service (IaaS), Platform as a Service (PaaS), Software as a Service (SaaS) and/or the like provided by one or more vendors, for example, Google Cloud, Microsoft Azure, Amazon Web Service (AWS) and Elastic Compute Cloud (EC2), IBM Cloud, and/or the like.

The screen activity agent 220, also referred to herein as "agent" in short, may be adapted to fetch, retrieve, and/or otherwise obtain a baseline policy defining rules and configurable parameters for performing acts and/or operations of dynamic on-device screen activity data processing, such as described herein with reference to the process 100 of FIG. 1. For example, the agent may communicate with and obtain from the remote server 206 a configuration file of the policy.

The screen activity agent 220 may monitor and record screen activity data on a screen display of the apparatus 200, included in the I/O interface 210. Optionally, the agent 220 may monitor one or more additional HMI interfaces of the I/O interface 210, such as a mouse, a keyboard, and/or the like, for tracking engagement level of the user 202, e.g., detecting whether the user 202 is active, idle, away from the apparatus 200, and/or the like. The information regarding the one or more of the HMI interfaces of the I/O interface 210 may be used by the agent 220 as input in determination of usage demand for resources of the apparatus 200 in performing one or more of the acts and/or operations of screen activity data processing. For example, the agent 220 may increase its capture rate when the user is active while postponing other actions to a later time when the user is idle again.

The screen activity agent 220 may analyze the captured screen data and extract therefrom textual information. The agent may use text extraction tools such as OCR and UI element recognition, for example. Optionally, the agent 220 may identify specific applications in use by the user 202 and adjust its capturing and/or analysis operations accordingly, e.g., change capture frequency and/or resolution, focus on specific UI elements, and/or the like. Additionally or alternatively, the agent 220 may perform the capturing and/or analysis according to data sensitivity considerations, as may be specified in the policy.

The screen activity agent 220 may store extracted information locally on the apparatus 200, specifically in a local database retained in the storage 214. Optionally the local database within the storage 214 may be adapted to store information in a structured format. In some embodiments, the local database in storage 214 may be optimized for rapid data retrieval and processing.

The screen activity agent 220 may generate screen activity data summaries from data stored in the local database of storage 214. The screen activity agent 220 may utilize one or more AI models for summarizing data, such as LLMs and/or the like. Optionally the agent may run the LLM(s) and/or likewise AI model(s) on an on-device NPU included in the processor(s) 212.

The screen activity agent 220 may transmit summarized data to the remote server 206. The remote server 206 may further process, analyze, store, and/or otherwise use the summarized data received from the apparatus 200 for performing a computation task, e.g., detecting anomalies and/or the like.

In some embodiments, the agent 220 may monitor one or more operational status parameters of the apparatus 200, such as for example, temperature, battery charge level, usage level of one or more of the processor(s) 212, e.g. CPU usage level and/or the like, usage level of one or more memory resources of the storage 214, network connectivity of one or more of the communication resources of the network interface 216, and/or the like. The agent 220 may make determinations regarding its screen activity data processing operations according to the policy and/or one or more values of respective monitored parameters of the apparatus 200, for example, pausing complex analysis operations for text extraction and/or summarization when entering low-battery mode, resuming such operations when acceptable charge level is reached again, and/or the like.

Additionally or alternatively, the agent 220 may monitor one or more behavioral parameters of the user 202, such as for example, engagement level, application usage patterns, activity peak hours, and/or the like, and adjust its activities according to the policy and/or values observed for the monitored parameters of the user 202. For example, in case where the user 202 engages in unusual hours of screen usage, the agent 220 may send an alert to the remote server 206, increase capture frequency and/or resolution, etc.

Yet additionally or alternatively, the agent 220 may monitor one or more administrative metrics of the screen activity data processing and/or management, e.g., summaries quota, summaries rate, local data age, logged information age, data backup age, and/or the like, and take an action according to the policy and/or values observed for the monitored administrative parameters. For example, in case that the summaries quota is reached and/or exceeded, the agent may alert the remote server 206, which may return in response an adjustment to that parameter to accommodate the excess.

Figure 3:
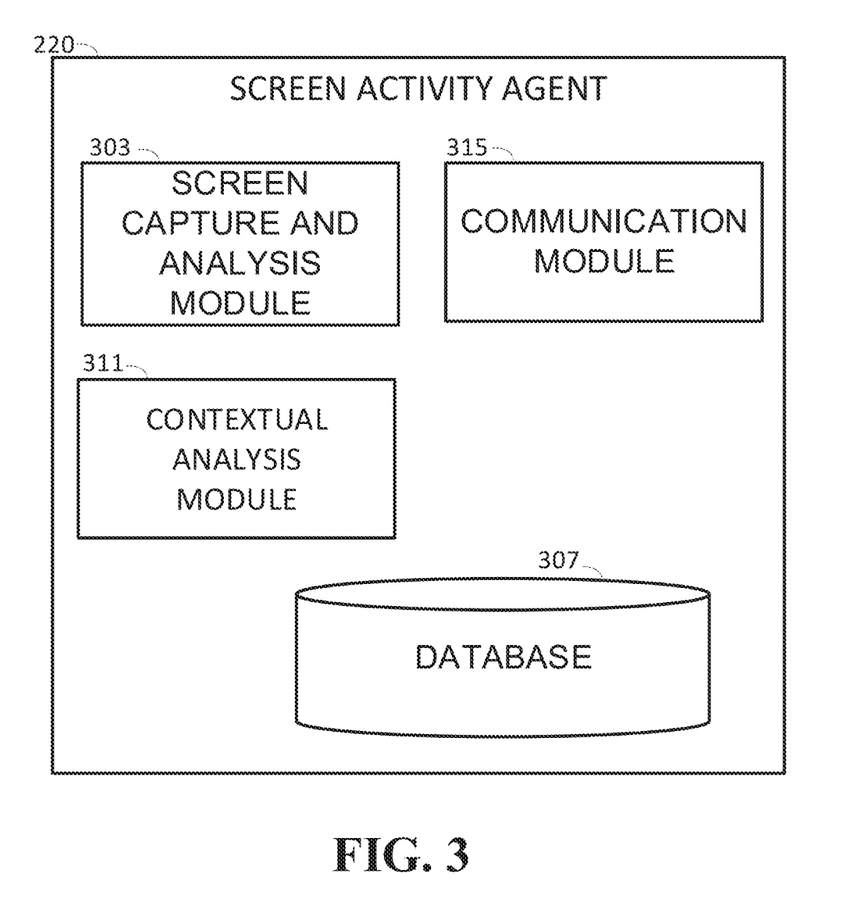
FIG. 3 is a block diagram of an exemplary agent for dynamic on-device screen activity data processing, according to some embodiments.

Reference is now made to FIG. 3 is a block diagram of an exemplary agent for dynamic on-device screen activity data processing, according to some embodiments. The agent 220 may be deployed on a computation device operated by a user, such as the apparatus 200 described with reference to FIG. 2 herein.

As shown on FIG. 3, the agent 220 may include a screen capture and analysis module 303, a local database 307, a contextual analysis module 311, and a communication module 315.

The screen capture and analysis module 303 may be configured to continuously monitor and record screen activity in real-time, optionally while simultaneously performing operations for extracting textual information from the screen data captured, such as for example, OCR, UI element recognition, and/or the like.

The screen capture and analysis module 303 may be configured to operate with a high degree of efficiency to minimize system resource consumption. For example, in scenarios where an energy supply source of the device may be depleted, e.g. its battery is low, the screen capture and analysis module 303 may dynamically adjust its capture frequency and/or resolution to conserve power.

Additionally or alternatively, the screen capture and analysis module 303 may pause or reduce its activity when the device enters a low-power mode, and may resume full operations once the battery level returns to an acceptable range.

In some embodiments, the screen capture and analysis module 303 may include logic to handle user interactions with the screen, for ensuring that text from dynamic UI elements may be accurately captured. To vit, in cases where the user may be actively interacting with the screen, the screen capture and analysis module 303 may prioritize capturing text from the most recently focused elements and/or windows, for ensuring relevance and context accuracy.

In some further embodiments, the screen capture and analysis module 303 may be capable of identifying specific applications in use, enhancing its ability to capture and analyze relevant information contextually. Such identification may be achieved, for example, through a combination of process enumeration, system log analysis, querying system application programming interfaces (APIs), and/or the like, optionally leveraging high privileges that may be accorded to the agent, to accurately determine the active and/or installed applications on the device.

The local database 307 may be configured to store locally on the device the extracted data and/or likewise information as may be obtained by the screen capture and analysis module 303. Optionally the extracted data may be stored in the local database 307 in a structured format. In some embodiments, the local database 307 may be designed to provide quick access with minimal latency, using efficient indexing and storage mechanisms, to allow the agent 220 to retrieve and process data rapidly, even under heavy load and/or when the device's resources may be constrained, for example.

The contextual analysis module 311 may be configured to analyze the captured and stored data as may be retained in the local database 307 to create summaries of the user's activity. Optionally the contextual analysis module 311 in order to perform its tasks of analysis and/or summarization may leverage lightweight AI models, such as for example, large language models (LLMs) and/or the like, which may be optimized for on-device processing to minimize adverse effect on the device's performance. In some embodiments, edge cases may include scenarios where the number of summaries per day has already been exceeded, but the user engages in unusual hours of screen usage. The contextual analysis module 311 may be configured to handle such exceptions by applying a priority-based approach, where the contextual analysis module 311 may evaluate the importance and/or uniqueness of the captured data against predefined criteria and/or user activity patterns, for example.

The communication module 315 may be configured to transmit summarized data as may be generated by the contextual analysis module 311 to a remote server such as 206 described with reference to FIG. 2 herein. The communication module 315 may be utilized to ensure reliable and/or secure data transmission.

In some embodiments, the communication module 315 may adhere to policies received from the server 206 regarding sensitivity and/or frequency of summarization and/or the like. For instance, if the server dictates a high-sensitivity policy, the agent 220 may adjust to capture and summarize data more frequently and from more specific UI elements, and conversely, a low-sensitivity policy may result in fewer summaries and focus on broader, less detailed data capture. The communication module 315 may accordingly adjust its data transmission operations to accommodate the varying throughput requirements at minimal or zero impact on the device's performance overall.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computation devices, neural processing units, user interfaces, artificial intelligence models, large language models, user interface element recognition and optical character recognition tools and/or techniques will be developed and the scope of these terms is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for dynamic on-device screen activity data processing, comprising:
    capturing data of screen activity on a display screen of a computation device;
    extracting textual information of the screen activity from the data captured;
    storing in a database residing locally on the computation device the textual information extracted;
    generating summarized data of the screen activity using the textual information stored in the database; and
    transmitting via a network communication interface at least a portion of the summarized data generated to a remote server configured to perform a task using summarized data received;
    wherein usage demand of on-device resources of the computation device for performing screen activity data processing operations of at least one of the capturing data, extracting textual information, storing, generating summarized data, and transmitting is dynamically determined according to a policy defining at least one rule associated with at least one configurable parameter and representing a tradeoff between conserving usage of the on-device resources and optimization of the summarized data received at the remote server for the task,
    and wherein the on-device resources are used in performance of the screen activity data processing operations according to the dynamic determination of the usage demand.

2. The method of claim 1, wherein a rule of the policy defines an action to be taken in response to a condition being met regarding a value of a respective one of the at least one configurable parameter associated with the rule.

3. The method of claim 2, wherein the action comprises a member selected from the group consisting of: reporting to the remote server; pausing performance of at least one of the capturing data, extracting textual information, generating summarized data, and transmitting; resuming performance of at least one of the capturing data, extracting textual information, generating summarized data, and transmitting; adjusting a frequency of performing the capturing data; adjusting a resolution of performing at least one of the capturing data and the extracting textual information; storing in the database summarized data generated; storing in the database log information; performing data retention management operation on the database; performing data backup operation; checking for updates to the policy from the remote server; and applying new rules per policy update received from the remote server.

4. The method of claim 1, wherein the at least one configurable parameter comprises an operational parameter of the computation device.

5. The method of claim 4, wherein the operational parameter comprises a member selected from the group consisting of: temperature; battery charge level; network availability; and resource utilization.

6. The method of claim 1, wherein the at least one configurable parameter comprises a behavioral parameter of a user of the computation device.

7. The method of claim 6, wherein the behavioral parameter comprises a member selected from the group consisting of: user engagement level; user engagement indicators; application usage patterns; user activity peak hours; and user activity data sensitivity.

8. The method of claim 1, wherein the at least one configurable parameter comprises an administrative parameter of user activity analysis performance and data management on the computation device.

9. The method of claim 8, wherein the administrative parameter comprises a member selected from the group consisting of: summarized data amount limit; summarized data rate limit; policy update checking rate; information logging level; log retention limit; local data retention limit; and data backup rate.

10. The method of claim 1, wherein the extracting textual information comprises performing at least one of: optical character recognition (OCR), and user interface (UI) element recognition.

11. The method of claim 1, wherein the storing in the database the textual information extracted utilizes a structured data format.

12. The method of claim 1, wherein the generating summarized data utilizes at least one lightweight artificial intelligence (AI) model optimized for the computation device.

13. The method of claim 12, wherein the at least one lightweight artificial intelligence (AI) model comprises a large language model (LLM).

14. The method of claim 12, wherein the at least one lightweight artificial intelligence (AI) model utilizes a local neural processing unit (NPU) of the computation device.

15. The method of claim 1, further comprising identifying an application actively in use by a user of the computation device, wherein at least one of the capturing data and extracting textual information is performed according to the application identified.

16. The method of claim 1, wherein the summarized data complies with privacy protection requirements whereby no personal information of a user of the computation device is derivable from the summarized data.

17. A computer program product for dynamic on-device screen activity data processing, the computer program comprising:
- a non-transitory computer readable storage medium;
- program instructions which, when executed by at least one processor, cause the at least one processor to perform operations comprising:
  - capturing data of screen activity on a display screen of a computation device;
  - extracting textual information of the screen activity from the data captured;
  - storing in a database residing locally on the computation device the textual information extracted;
  - generating summarized data of the screen activity using the textual information stored in the database; and
  - transmitting via a network communication interface at least a portion of the summarized data generated to a remote server configured to perform a task using summarized data received;
  - wherein usage demand of on-device resources of the computation device for performing screen activity data processing operations of at least one of the capturing data, extracting textual information, storing, generating summarized data, and transmitting is dynamically determined according to a policy defining at least one rule associated with at least one configurable parameter and representing a tradeoff between conserving usage of the on-device resources and optimization of the summarized data received at the remote server for the task,
  - and wherein the on-device resources are used in performance of the screen activity data processing operations according to the dynamic determination of the usage demand.

18. An apparatus for dynamic on-device screen activity data processing, comprising:
- at least one hardware processor adapted for:
  - capturing data of screen activity on a display screen of a computation device;
  - extracting textual information of the screen activity from the data captured;
  - storing in a database residing locally on the computation device the textual information extracted;
  - generating summarized data of the screen activity using the textual information stored in the database; and
  - transmitting via a network communication interface at least a portion of the summarized data generated to a remote server configured to perform a task using summarized data received;
- wherein usage demand of on-device resources of the computation device for performing screen activity data processing operations of at least one of the capturing data, extracting textual information, storing, generating summarized data, and transmitting is dynamically determined according to a policy defining at least one rule associated with at least one configurable parameter and representing a tradeoff between conserving usage of the on-device resources and optimization of the summarized data received at the remote server for the task,
- and wherein the on-device resources are used in performance of the screen activity data processing operations according to the dynamic determination of the usage demand.

* * * * *